United States Patent

Dahms et al.

[15] 3,648,281

[45] Mar. 7, 1972

[54] ELECTROSTATIC DISPLAY PANEL

[72] Inventors: Harald Dahms, Ossining; Heinrich E. Hunziker, Katonah, both of N.Y.

[73] Assignee: International Business Machines Corporation, Armonk, N.Y.

[22] Filed: Dec. 30, 1969

[21] Appl. No.: 889,279

[52] U.S. Cl. ....................340/373, 340/324, 340/378, 340/366

[51] Int. Cl. ....................G08b 5/00

[58] Field of Search ....................340/373, 366, 324, 378, 44; 324/109; 310/5, 6, 20, 22; 178/7.5

[56] References Cited

UNITED STATES PATENTS

| | | | |
|---|---|---|---|
| 2,888,671 | 5/1959 | Bolie | 324/109 |
| 2,952,835 | 9/1960 | Aiken | 324/109 |
| 3,460,134 | 8/1969 | Aiken | 340/378 |
| 3,516,086 | 6/1970 | Aiken | 340/373 |
| 3,553,364 | 10/1970 | Lee | 178/7.5 |

*Primary Examiner*—Robert L. Griffin
*Assistant Examiner*—Richard P. Lange
*Attorney*—Hanifin and Jancin and George Baron

[57] ABSTRACT

This disclosure describes an electromechanical display panel operated by electrostatic forces. The panel is composed of individual display units which provide dual color display under passive illumination. Their distinctive feature is a novel and very simple configuration, leading to advantages of small size, high speed, relatively low-operating voltage and feasibility of fabricating economically panels containing a large number of such units. The units consist of electrically conducting, rectangular flags, positioned within parallel, V-shaped grooves by a magnetic field that biases the flag toward the central position in the groove. The panel possesses the half-select property. Voltages are applied to the flags and to electrode strips on the groove walls to cause a selected flag to show one or its other side. No erase step is required between writing operations. A written pattern is held indefinitely by electrostatic biasing and can be read out by employing the capacitance between a flag and its adjacent wall electrode.

13 Claims, 7 Drawing Figures

Patented March 7, 1972 3,648,281

3 Sheets-Sheet 1

INVENTORS
HARALD DAHMS
HEINRICH E. HUNZIKER

BY [signature]
ATTORNEY

FIG. 3A
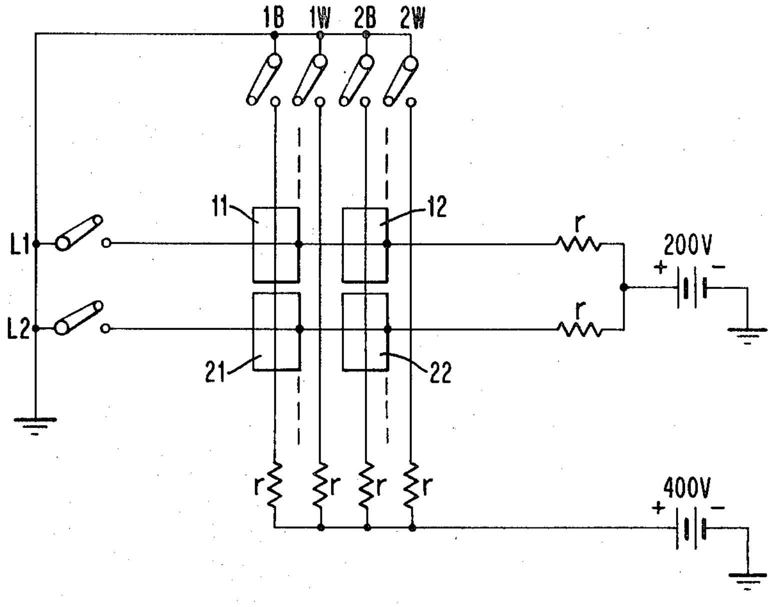
FIG. 3B
| STEP | OPERATION | SWITCH CONDITION (O FOR OPEN, C FOR CLOSED) L1 | L2 | 1B | 1W | 2B | 2W | EFFECT |
|---|---|---|---|---|---|---|---|---|
| 0 | HOLD | O | O | O | O | O | O | PATTERN, WITH FLAGS 11, 12, 21 AND 22 WHITE, IS HELD |
| 1 | WRITE LINE 1 | C | O | C | O | O | C | FLAG 11 MOVES TO BLACK STATE |
| 2 | WRITE LINE 2 | O | C | O | C | C | O | FLAG 22 MOVES TO BLACK STATE |
| 3 | HOLD | O | O | O | O | O | O | NEW PATTERN, WITH FLAGS 11 AND 22 BLACK, FLAGS 12 AND 21 WHITE, IS HELD |
FIG. 3C
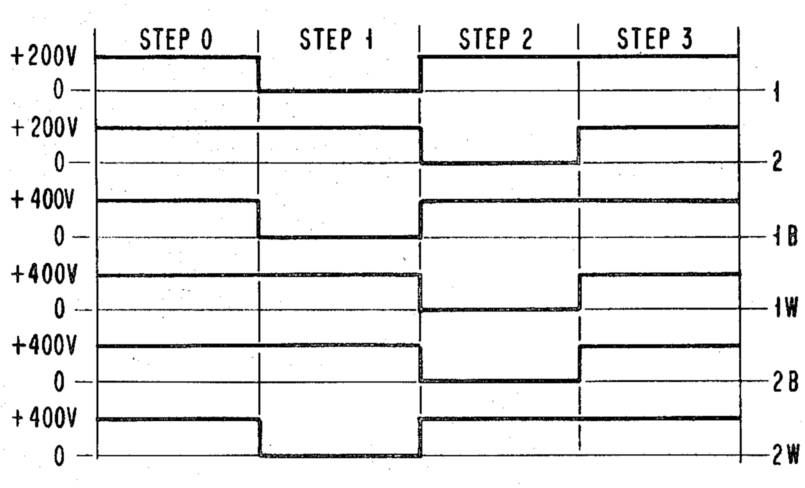

ELECTROSTATIC DISPLAY PANEL

This invention relates to electromechanical display devices which employ electrostatic forces for moving their adjustable components. More specifically, it describes a type of device in which flags or vanes are moved electrostatically, in the manner in which pages of a book are turned over, in order to display or conceal areas exhibiting different markings or colors. U.S. Pat. Nos. 3,089,120, 3,304,549, 3,319,246 and 3,373,422 to W. R. Aiken describe devices of the general nature to which the present invention pertains. Devices covered by these patents operate with rectangular vanes connected by mechanical hinges to boxlike electrode structures. By applying suitable voltages to the vane and electrodes, the vane can be rotated, usually motion can be assisted by mechanical biasing springs. A number of display units of this kind can be assembled to form a display panel, a rectangular array whose units are addressed by row and column, as exemplified by the above-noted U.S. Pat. No. 3,304,549.

With the prior art, as exemplified by the above-noted patents, it would be difficult and expensive to produce a high-resolution panel containing a large number (e.g., 600×600) of miniaturized units, since each of these units requires a hinge, a spring, and other mechanical features. Also, the minimum size and weight which these features imply make very high operating voltages necessary. In addition to this, display panels as known to the prior art do not have several important and desirable properties. First, their appearance is not independent of the point in front of the panel from which the panel is viewed. As an example, if the observer is located above a panel, as described in U.S. Pat. No. 3,304,549, vanes switched back into the electrode boxes become visible. Second, an individual display unit cannot be addressed without simultaneously affecting other units also. This point is exemplified by FIG. 3 of U.S. Pat. No. 3,304,549. Third, the asymmetry inherent in display units known to the prior art make a separate erase operation necessary prior to writing a new pattern on the display panel. The present invention overcomes the above-noted disadvantages and possesses the desirable properties mentioned herein.

The primary object of the present invention is to provide a display panel composed of a new type of display unit which can readily be produced in small size and large quantities. This is accomplished by a design which completely avoids mechanical features as hinges, springs, and the like. Inherent in the small size of the display unit are a lower operating voltage and a higher switching speed.

Another object is to provide a display panel with the property that a pattern displayed on it can be viewed from any point in front of the panel without change in appearance and contrast.

Another object is to provide a display panel in which any display unit can be selectively addressed without affecting any other unit in the panel.

A further object is to provide a display panel in which writing operations can succeed each other without a need for an intermediate erase step.

Still a further object is to provide a display panel which has the properties of an electromechanical memory with non-destructive readout. These properties derive from the fact that a pattern written on the panel can be held indefinitely, until it is either written over or erased, and that a pattern thus stored can be read out at any time.

The properties listed as objects of the invention all derive from the design of the basic display unit. This consists of a rectangular flag held by magnetic attraction in a V-shaped groove, similar to a page in a half-opened book. The flag is magnetically biased towards a position symmetrically between the two groove walls. In this position, it is perpendicular to the base of the display unit and parallel to the field of a permanent magnet incorporated into this base. The flag, having a permanent magnetic moment of its own, is thereby both retained in the groove and biased toward the middle position, making mechanical hinges and springs unnecessary.

The flag and both groove walls are electrically conducting and can be separately connected to voltage sources, the groove walls being protected by a thin layer of material of high resistance. Thus a flat can be held against one of the groove walls by a voltage difference between the flag and the appropriate wall electrode regardless of, within wide limits, what the voltage of the other wall electrode is. This latter property makes it possible to address single units contained in a rectangular array by row and column without affecting any other unit. If the flag and the wall electrode to which it is being held are brought to the same voltage, the flag is released and the magnetic biasing mechanism starts the flag moving towards the opposite groove wall. If this wall is at a voltage different from that of the flag, it will attract the flag and hold it in place until the same process is repeated in the reverse direction. Since the starting and final positions of such a writing operation are equivalent, no intermediate erase step between two subsequent writing operations is necessary. The main effect of the magnetic biasing is to shorten the transit time of the flag from one groove wall to another.

One side of the flag and its adjacent groove wall are given the same color, e.g., white, and the other flag side and groove wall another color, e.g., black. Thus, as in a book in which it is assumed that two opposite pages are black, and the following two opposite pages white, the appearance of the display unit can be changed from black to white, or, generally, from one color to another, by "turning the page," i.e., by moving the flag from one groove wall to the other. This change in appearance can be observed equally well from any point in front of the display unit.

Since the capacitance between a flag and the wall electrode to which it is being held can easily be made a hundred times larger than the capacitance between flag and opposite wall electrode, the position of the flag can be sensed by determining the wall electrode through which a short electrical pulse applied to the flag is being returned. It is this feature which gives the present invention the properties of an electromechanical memory with nondestructive readout.

The foregoing and other objects, features and advantages of the invention will be apparent from the following more particular description of the preferred embodiments of the invention as illustrated in the accompanying drawings.

DESCRIPTION of THE DRAWINGS

The scope of the invention, its construction and functioning, can be better understood by referring to the detailed description given below. Reference will be made to FIGS. 1A to 3C, where:

FIG. 3A represents schematically a four-unit display panel, showing the electric circuitry required to write and store arbitrary patterns.

FIG. 3B is a table showing the switching sequence required to write an example pattern in the panel of FIG. 1A, as outlined in the text.

FIG. 3C shows the sequence of electrical pulses which, when applied to the electrodes of FIG. 3A, is equivalent to the switching sequence of FIG. 3B.

Figure 1A:
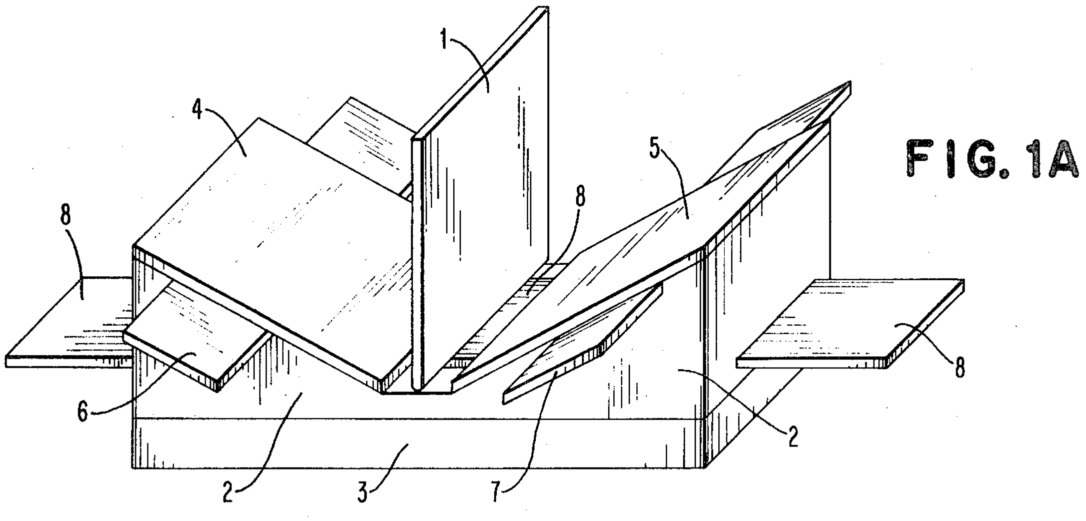
FIG. 1A shows a preferred embodiment of the individual display unit.

The essential parts of an individual display unit are shown in FIG. 1A. An electrically conducting, rectangular flag 1 is located in a V-shaped groove. The groove is made to have a wide angle to enable one, standing on the front side of the display unit, to enhance visibility and contrast when viewing the display unit from any angle. Thus, the wide-angle groove can be made to vary from about 60°–140°, but a groove that is 90°–120b$L$ wide is preferred for optimum viewing. This groove is cut into an electrically insulating body 2 which is mounted on a base 3. Flag 1 is restricted to a pivoting motion around the vertex of said groove, by means to be described later. Into body 2 are incorporated metal strip electrodes 6, 7 and 8. Electrode 8 runs at right angles to said groove and is in electrical contact with flag 1 at the pivoting end of said flag 1. Electrodes 6 and 7 are covered with sheets 4 and 5 consisting of a high-resistance film.

A dual color display is obtained as follows: Sheet 4 and the side of flag 1 adjacent to it are given the same color, e.g., black. The other side of said flag 1 and sheet 5 are given a second and different color, e.g., white. Colors may be inherent in the materials used for flag 1 and sheets 4 and 5, or painted on. If flag 1 rests against sheet 4, the whole display unit will appear in one color, e.g., white. If flag 1 rests against sheet 5, the display unit will show a different color, e.g., black. Although color pairs like black and white have been chosen as the means for obtaining contrasting states of a display unit, it is understood that any equivalent means can be used to obtain dissimilar optical properties, including other combinations of other colors, variations in transparencies, reflectivities, etc. Thus, sheet 4 and the side of vane or flag 1 facing sheet 4 can be made highly reflecting while sheet 5 and the side of flag 1 facing it can be dull or nonreflecting.

Figure 1B:
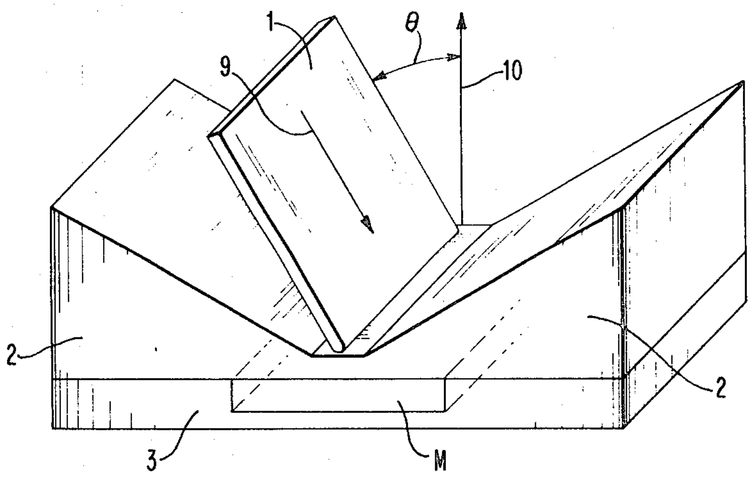
FIG. 1B indicates the preferred magnetic scheme for locating and biasing individual flags with certain electrodes and insulating films deleted.

Flag 1 is biased toward a position in the middle of said groove, i.e., symmetrically between sheets 4 and 5. Said bias, and restriction of flag 1 to pivoting around the vertex of said groove, can be achieved in several ways. Examples are given in FIGS. 1B and 1C. The preferred magnetic scheme is shown in FIG. 1B. The entire flag 1, or a part of it (e.g., its pivoting end) is made from a material which can be permanently magnetized, with a magnetic moment 9 in the plane of flag 1 and at right angles to its pivoting edge. This display unit is put into a permanent magnetic field 10, which is antiparallel to moment 9 when flag 1 is in its middle position. Field 10 is produced preferentially by incorporating a permanent magnet M into base 3. Magnetic attraction pulls flag 1 into the vertex of said groove and onto electrode strip 8 (see FIG. 1A) and thus restricts its motion to pivoting. Flag 1 is also biased toward its middle position with a torque proportional to moment 9, magnetic field 10 and sin $\theta$, where $\theta$ is the angular deviation from the middle position.

Figure 1C:
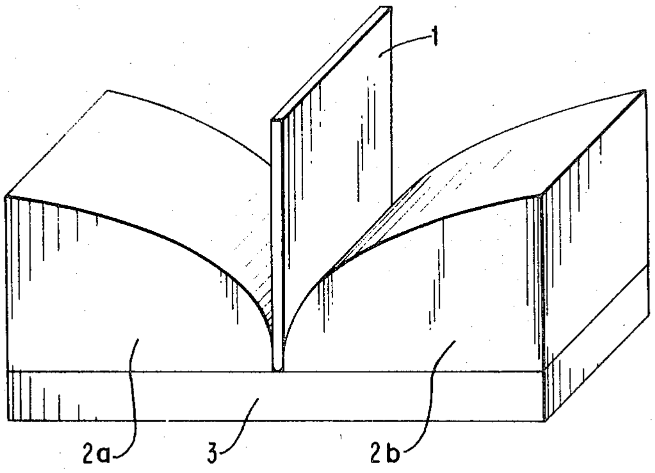
FIG. 1C shows an alternate method for locating and biasing individual flags.

Another scheme for holding flag 1 in place and biased towards its median position is shown in FIG. 1C. In this scheme, flag 1 is clamped between the body halves 2*a* and 2*b* and is biased toward the middle by its elasticity. The groove walls are rounded to achieve smooth flexing of flag 1. By clamping or otherwise affixing vane 1 at the bottom or vertex of the trough or groove, such vane is prevented from being dislodged by vibrational shock, as might be the case when only a magnetic field is relied upon for retaining the vane in its groove seat. Additionally, the elasticity of vane 1 adds to the restoring force of the magnetic field and thus further enhances the switching speed of a vane when it is electrostatically switched from one wall of the groove to the other wall of the same groove.

Switching of the display unit occurs as follows: Assume that sheet 4 (see FIG. 1A) is black, sheet 5 is white, and the previous switching operation has resulted in flag 1 resting against sheet 4. As explained above, this results in the display showing white. Flag 1 can be held in this position indefinitely by applying a quiescent potential $V_1$ (e.g., 200 volts) to said flag via electrode 8 and another quiescent potential $V_2$ (e.g., 400 volts) to both electrodes 6 and 7. If it is desired to switch to a black display, flag 1 and electrode 6 are momentarily switched to a source of potential $V_3$ (e.g., 0 volts). Attraction between flag 1 and electrode 6 ceases, flag 1 st arts moving toward electrode 7 propelled by the magnetic or elastic biasing force, and is eventually attracted to electrode 7 by the voltage difference $V_3-V_2$ , e.g., 400 volts. If voltage $V_3$ is applied to flag 1 and electrode 7, in order to obtain a white display, nothing happens: The unit shows white already, according to the initial assumption, and is held in this position by the voltage $V_3-V_2$ . After disconnecting the switching potential $V_3$, the display unit remains fixed in its new position by the quiescent potentials described. Note that applying the switching potential $V_3$ to either electrode 6 or 7, or flag 1 separately, will result in no change, since flag 1 will continue to be held in whatever position it may be by a potential difference, e.g., 200 or 400 volts.

The position of flag 1 can be read out by applying a short electrical pulse to electrode 8. Due to the much larger, e.g., 100 times larger, capacitance between flag 1 and the electrode to which it is being held, this pulse will be received on electrode 6 but not on electrode 7, if flag 1 rests against sheet 4. In the alternate position of flag 1, the reverse will be true and the readout pulse will be received on electrode 7. If it is desired, read out also can be achieved by sending a short electrical pulse through electrode 6 and sensing a pulse on electrode 8 if flag 1 is adjacent electrode 6, but sense no output pulse if flag 1 is adjacent electrode 7. In a similar manner, the interrogating pulse can be sent through electrode 7 and suitable sensing of the state of flag 1 will take place along electrode 8.

A display unit of the type described has been built and successfully operated. Flag 1 was made from a 5×5-mm. piece of video magnetic tape, having a weight of 0.006 g./cm.$^2$, and made electrically conducting by coating it with a colloidal graphite solution (DAG dispersion No. 154, Acheson Colloids Co., Port Huron, Michigan). Body 2 consisted of plexiglass, 0.25 inches thick, into which a 90° groove was cut with a width of 1 mm. at its base. Electrodes 6 and 7 were painted on the wall of said groove with said graphite solution, in the form of strips 3 mm. wide. These electrodes were covered by sheets 4 and 5 consisting of Teflon tape, 0.003 inches thick. Electrode 8 was made from copper sheet 0.2 inches thick, under which a bar magnet M was placed providing a field of about 150 gauss at the position of said flag. The device was operated with a switching voltage of 1,000 volts.

The time it takes for flag 1 to move from one end position, e.g., on sheet 4, to the other, e.g., on sheet 5, was calculated. For this calculation, the product of moment 9 and field 10 was chosen small enough to make the middle position of said flag ($\theta$=0 in FIG. 1B) unstable with writing voltages applied as outlined above. Friction and air resistance were neglected. The resulting equation for the switching time $t$, for a total travel of 90°, is $$t=4.5(Ma/3V^2bC)^{0.5}$$

$M$ is the mass of the flag, which is assumed square, with side length $a$. $V$ is the voltage difference between flag 1 and the attracting electrode (either electrode 6 or 7). The constant $C$, as obtained from capacitance measurements with a large scale model of a display unit, is $1.14\times10^{-10}$ farad/meter.

The switching time $t$ can be shortened by covering the display device with a transparent, conducting cover, which is just cleared by a moving flag 1, and to which is applied a constant quiescent potential $V_1$ equal to the quiescent potential $V_1$ applied to electrodes 6 and 7. If this is done, the numerical factor in said equation is 3.6 instead of 4.5.

For the experimental display unit built and operated as described above, a switching time of $21\times10^{-3}$ sec. was calculated from said equation. If said experimental unit is scaled down by a factor of 5, and a switching voltage of only 400 bolts is used, the calculated switching time is $2\times10^{-3}$ sec.

The following general relationships are predicted by said equation: The switching time $t$ is proportional to the second power of the linear dimensions of a display unit and it is inversely proportional to the switching voltage $V$.

Figure 2:
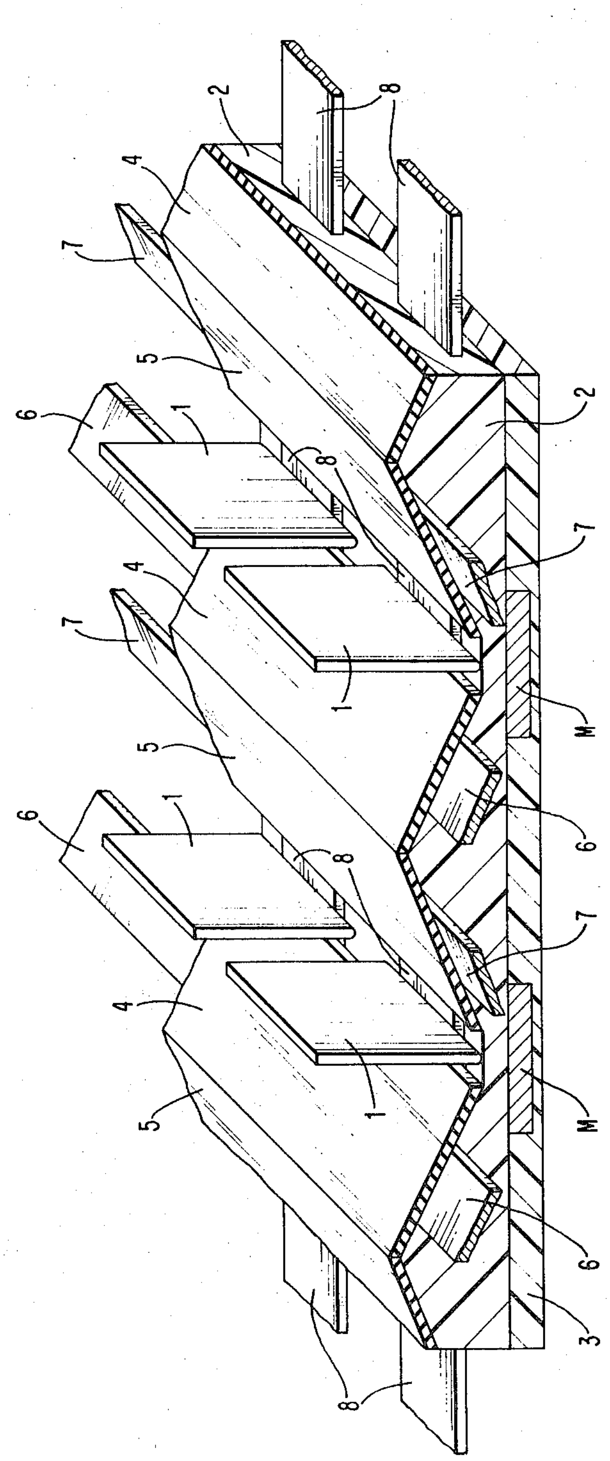
FIG. 2 is a portion of a matrix of display units that compose a display panel.

The display units as described so far can be joined together to display panels. A portion of such a display panel is shown in FIG. 2 wherein 2×2 display is illustrated. As was indicated earlier, such panels can comprise a 600×600 array of flags if desired. The parts shown in FIG. 1A can be made as an integrated display panel. Body 2, base 3, sheets 4 and 5, electrodes 6, 7 and 8 are fabricated as part of an extended periodic structure, rather than as individual units. In the preferred embodiments, only vanes or flags 1 will be made as individual elements to be incorporated in the integral display panel.

The electric circuitry necessary to write arbitrary patterns on a display panel consisting of four display units is shown in FIG. 3A. Flags 11, 12, 21 and 22 are electrically connected to line electrodes 1L and 2L. Line electrodes 1L and 2L correspond to electrode 8 of an individual unit shown in FIG. 1A. The groove vertices are indicated by vertical, broken lines. Along the walls of said grooves run, in pairs, column electrodes 1B and 1W for a first groove and column electrodes 2B and 2W for the second groove. Electrodes 1B and 1W (or 2B and 2W) correspond, respectively, to electrodes 6 and 7 of FIG. 1.

All electrodes L1, L2, 1B, 1W, 2B and 2W can be individually connected to a source of zero volts potential by switches. If switches for electrodes L1 and L2 are open, lines L1 and L2 have a quiescent potential of 200 volts. If switches for electrodes 1B, 1W, 2B and 2W are open, corresponding electrodes have a quiescent potential of 400 volts. The quiescent voltage sources are connected to electrodes through high resistances *r*. It is understood that the voltages as well as the number of display units employed to illustrate the operation of the invention can have other values without departing from the spirit of the invention.

Writing of a display pattern occurs as follows: Assume that flags 11, 12, 21 and 22 are each held to their corresponding left-hand groove walls as shown in FIG. 3A so that all units display white. It is desired to write a pattern with flags 11 and 22 showing black and flags 12 and 21 showing white. The sequence of operations for producing this pattern is shown in FIG. 3B. Lines are addressed by closing the corresponding line switches for electrodes L1 and L2. Only if this is done will closing of the switches on column electrodes 1B, 1W, 2B, and 2W have any effect on the flags in said selected line L1 or L2. If the switch on a column electrode labeled B, e.g., 1B, is closed, a black display results. If the switch on a column electrode labeled W (e.g., 1W) is closed, a white display results. These effects occur independently of whether the state of the display unit was white or black before the switching occurred.

If the switch on a line electrode (L1 or L2) is reopened, said flags of said line will be held in their new position by said quiescent potential of said line electrode, regardless of whether or not further switching of said column electrodes occurs.

Although the V-shaped grooves are shown as wide angled, namely, between 90°–120°, the invention described herein also envisions using a narrow groove, one that is less than 90°, and preferably 60° or less. In such instance, electrostatic switching of a flag can take place sufficiently rapidly without the need of a magnetic or elastic biasing force to accelerate the switching process. For such a groove, the invention is operative without the need of a magnet to supply a restoring force. However, in such modification, one sacrifices the advantages of the wide groove angle as noted hereinabove.

It should be understood that said switches are figurative and can be replaced by any suitable electronic valve, and that said switches or electronic valves can be operated automatically by a punched tape, a computer interface, or other information-transmitting systems. The sequence of electrical pulses on electrodes L1, L2, 1B, 1W, 2B and 2W which is equivalent to the switching program given in FIG. 3B is represented in FIG. 3C.

It should also be pointed out that embodiments of the display panel described in this invention, like the one partially represented in FIG. 2, lend themselves easily to mass production, in stark contrast to electrostatic display panels known in the prior art.

The type of display panel disclosed here has a very wide range of potential applications. One of its advantages is passive illumination, which makes it useful as a display in bright daylight or brightly illuminated rooms. It can be used for bulletin boards, billboards, visual public address systems, traffic signs, large airport and military operations displays, document retrieval and the like. Since this invention makes it feasible to produce, e.g., a 100×100 cm. display panel containing 1,000×1,000 elements (1 mm.$^2$ flags), black and white or color pictures can displayed with high resolution. The individual address feature of the panels here described makes partial updating of displays possible. After a number of such updatings, the new status of the panel can be read out by making use of the readout feature inherent in this invention, as described above.

What is claimed is:

1. A display unit comprising a V-shaped trough,
an electrode on each wall of said trough,
an insulator on each electrode,
a magnetized and electrically conducting vane inserted in said trough,
means for selectively applying a vane-attracting electrical potential to only one said electrode so as to draw said vane towards said selected electrode, and
magnetic bias means applied to said vane so as to tend to attract said vane towards a position midway between said two electrodes as well as toward the vertex of said groove.

2. A display unit comprising a wide angled V-shaped trough,
a magnetized, electrically conducting vane inserted in said trough,
a magnet for biasing said vane midway between the facing walls of said trough,
means for applying an electrical potential difference between said vane and the first wall of said trough that greatly exceeds the potential difference between said vane and the second wall of said trough so as to urge the vane toward said first wall, and
means for maintaining said vane in its urged position by applying the same potential to each trough wall.

3. A display unit comprising a wide angled V-shaped trough cut into an electrically insulated member,
an electrode on each wall of said trough,
an insulator on each electrode,
a magnetized electrically conducting vane located in said trough,
a magnet for applying a magnetic field to said vane so as to urge said vane toward a position midway between said insulators,
means for applying an electrical potential difference between said vane and a first electrode that greatly exceeds the potential difference between said vane and the second electrode so as to urge the vane towards the insulator associated with the first electrode, and
means for maintaining said vane in its urged position by applying substantially the same potential to each electrode.

4. Means for reading out the state of the display unit of claim 3 comprising means for sending an electrical pulse to said vane whereby such electrical pulse, due to capacitance effect, appears on that electrode which is closer to the vane.

5. Means for reading out the state of display unit of claim 3 comprising means for sending an electrical pulse to one of said electrodes whereby such electrical pulse, due to capacitance effect, appears on that vane which is closer to the pulse-carrying electrode.

6. A signalling device comprising an electrically conducting strip,
an electrically insulating member atop of said strip,
an electrically insulating member atop of said strip,
a substantially V-shaped trough cut in said insulating member,
an electrode on each wall of said trough and not in electrical contact with said strip,
electrically insulating coverings on said electrodes,
a magnetized electrically conducting vane located in said through in contact with said strip and rotatable toward such coverings,
a magnet for applying a magnetic field to said vane for biasing the latter midway between said coverings, and means for applying vane-attracting potentials separately to said electrodes.

7. A signalling device comprising a support of insulating material, a substantially V-shaped trough cut in said insulating material, an electrode on each wall of said trough, black electrically insulating material covering one electrode and white electrically insulating material covering the other electrode, a magnetized electrically conducting vane located in said trough and rotatable towards either wall, a magnet for applying a magnetic field to said vane for biasing the latter towards a position midway between said walls, said vane whose upright surface faces the white insulation is colored in a matching white and that upright vane surface facing the black insulation is colored in a matching black.

8. A signalling device comprising a support of insulating material, a substantially V-shaped trough cut in said insulating material, an electrode on each wall of said trough, an electrically insulating covering on each electrode, a magnetized electrically conducting vane located in said trough and rotatable towards either wall, the optical characteristic of a first covering and the surface of the vane facing it being dissimilar to the optical characteristic of the second covering and its facing vane surface, and means for applying a vane-attracting electrical potential to only one of said electrodes so as to draw said vane toward said selected electrode.

9. A signalling device comprising an electrically conducting strip, an electrically insulating member atop of said conducting strip, a substantially V-shaped trough cut in said insulating member, an electrode on each wall of said trough and not in electrical contact with said strip, black electrically insulated material covering one electrode and white electrically insulated material covering the other electrode, a magnetized electrically conducting vane located in said trough in contact with said strip and rotatable towards either wall, a magnet for applying a magnetic field to said vane for biasing the latter toward a position midway between said walls, said vane whose upright surface faces the white insulation is colored in a matching white and that upright vane surface facing the black insulation is colored in a matching black.

10. The signalling device of claim 9 including means for applying independent voltages to said electrodes and conducting strip.

11. In a display panel comprising an array of display units, each unit comprising an electrically conducting strip, an electrically insulated member supported by said strip, substantially V-shaped grooves cut in said insulated member, an electrode on each wall of said groove and insulated from said strip, electrical insulators over said electrodes, a magnetized electrically conducting vane located in said groove and in electrical contact with said strip, a magnet adjacent said strip for supplying a magnetic field to maintain said vane intermediate of said insulators when no potential difference exists between said vane and said electrodes, and means for sending the same electrical potential to one electrode and said vane but a different potential to said second electrode so as to rotate said vane towards said second electrode.

12. The invention of claim 11 wherein said vane is maintained in its rotated position toward the second electrode by returning the vane to a quiescent potential and both said electrodes to the same potential, the latter being different from the vane potential.

13. In a display panel comprising an array of display units, each unit comprising an electrically conducting strip, an electrically insulated member adjacent said strip, substantially V-shaped grooves cut in said insulated member, an electrode on each wall of said groove and insulated from said strip, electrical insulators over said electrodes, one insulator being black and the other insulator white, a magnetized electrically conducting vane located in said groove and in electrical contact with said strip, a magnetic adjacent said strip for supplying a magnetic field to maintain said vane intermediate of said insulators when no potential difference exists between said vane and electrodes, said vane being white on that surface which faces the white insulation and black on that surface which faces the black insulation, and means for sending the same electrical potential to one electrode and said vane but a different potential to said second electrode so as to rotate said vane towards said second electrode.

* * * * *